United States Patent
Li et al.

(10) Patent No.: US 6,813,733 B1
(45) Date of Patent: Nov. 2, 2004

(54) DIAGNOSTIC SYSTEM

(75) Inventors: Susan X. Li, Herndon, VA (US); David Alan Thistlethwaite, Alexandra, VA (US); Glen Michael Allison, Potomac Falls, VA (US); Mark Stanley Prendergast, Ashburn, VA (US); Jing Kang, Shatin (HK)

(73) Assignee: America Online, Inc., Dulles, VA (US)

(*) Notice: Subject to any disclaimer, the term of this patent is extended or adjusted under 35 U.S.C. 154(b) by 0 days.

(21) Appl. No.: 10/442,278

(22) Filed: May 21, 2003

Related U.S. Application Data

(63) Continuation of application No. 09/849,915, filed on May 7, 2001, now abandoned
(60) Provisional application No. 60/202,073, filed on May 5, 2000.

(51) Int. Cl.[7] .............................................. G06F 11/00
(52) U.S. Cl. .............................. 714/47; 714/4; 714/25; 714/38; 717/128
(58) Field of Search ............................... 714/4, 25, 38, 714/46, 47; 717/124–128

(56) References Cited

U.S. PATENT DOCUMENTS

| | | | | |
|---|---|---|---|---|
| 4,514,846 A | * | 4/1985 | Federico et al. | 714/45 |
| 5,455,933 A | * | 10/1995 | Schieve et al. | 714/27 |
| 5,678,002 A | * | 10/1997 | Fawcett et al. | 345/709 |
| 5,745,669 A | * | 4/1998 | Hugard et al. | 714/3 |
| 5,854,828 A | * | 12/1998 | Kocis et al. | 379/93.31 |
| 6,170,065 B1 | * | 1/2001 | Kobata et al. | 714/7 |
| 6,298,457 B1 | * | 10/2001 | Rachlin et al. | 714/49 |
| 6,539,499 B1 | * | 3/2003 | Stedman et al. | 345/709 |
| 6,601,190 B1 | * | 7/2003 | Meyer et al. | 714/37 |

OTHER PUBLICATIONS

DMTF—About—About the DMTF, DMTF Overview, printed from http://www.dmtf.org/about/index.php on Mar. 17, 2003, p. 1.
DMTF—About—CIM FAQs, CIM FAQs, printed from http://www.dmtf.org/about/faq/cim.php on Mar. 17, 2003, pp. 1–3.
DMTF—Specification for CIM Operations over HTTP, Specification for CIM Operations over HTTP (version 1.0, Aug. 11th, 1999), printed from http://www.dmtf.org/download/spec/xmls/CIM_HTTP_Mapping10.php on Mar. 17, 2003, pp. 1–33.
DMTF, System Diagnostic Model White Paper (DSP0138), A Diagnostic Model in CIM (Jan. 6th, 2000), pp. 1–22.
DMTF, The Common Diagnostics Model Evolution and Application, DMTF 2002 Developers' Conference Jun. 10–13, 2002, pp. 1–43.
PDF document—Introductions, Speakers & Instructors, 65 pages, printed from http://www.dmtf.org/download/presentations/conf2000/v104.pdf on Mar. 17, 2003.

* cited by examiner

*Primary Examiner*—Scott Baderman
*Assistant Examiner*—Emerson Puente
(74) *Attorney, Agent, or Firm*—Fish & Richardson P.C.

(57) ABSTRACT

Diagnostics may be enabled on a networked computer system by executing, at the networked computer system, a client application that enables connectivity by the networked computer system to a network of other computer systems. A diagnostic application is executed at the networked computer system and independently of the client application. The diagnostic application is configured to monitor the operational status of the client application and to track client status information related to the monitored operational status of the client application. Access to the client status information is enabled when performing diagnostics on the client application or the networked computer system.

31 Claims, 14 Drawing Sheets

DIAGNOSTIC SYSTEM

This application is a continuation of U.S. application Ser. No. 09/849,915, filed May 7, 2001, now abandoned and claims the benefit of U.S. Provisional Application No. 60/202,073, filed May 5, 2000, both of which are incorporated by reference.

TECHNICAL FIELD

This invention relates generally to a communications system and more particularly to a communications system for providing customer service to a subscriber based at least in part upon information relating to a client system.

BACKGROUND

Customer service representatives receive calls from customers seeking help to resolve technical problems involving products and services, such as, for example, Internet access, computer software, and/or computer hardware. To assist in the resolution of technical problems, a customer service representative often requires certain information about the customer's computer system. Such information may not be readily available, and a customer may not know or have the ability to find out the required information.

SUMMARY

In one general aspect, customer service is provided based at least in part on analysis of the information related to a client associated with a subscriber of a communications system. The information may be generated by a diagnostic application configured to identify system characteristics of the client in response to a command by the subscriber.

Implementations may include one or more of the following features. For example, the diagnostic application may be installed on the client system, such as, in an OSP client application and/or an interactive TV client application. The diagnostic application also may be installed on a host system, such as, for example, an OSP host system. The host system may receive at least a portion of the information related to the client system by e-mail, instant messaging, or in an on-line chat room.

The diagnostic application may include a program that loads dynamic link libraries having a predetermined extension and may be configured to identify hardware and/or software characteristics of the client system. The diagnostic application may create an output file including information related to disk drive space, a location of a file and/or folder of a client application, a pathname of a computer program, a version of a computer program (e.g., browser application), a client processor, client memory, system resources, multimedia capability, client status, and/or compliance with recommended system requirements. The output file information may be stored on the client and/or the host.

The host system may provide customer service including remedial steps for improving client performance such as, for example, clearing a cache, installing software, uninstalling software, and/or updating software.

These and other aspects may be implemented by an apparatus and/or a computer program stored on a computer readable medium. The computer readable medium may be a disk, a client device, a host device, and/or a propagated signal. Further, these general and specific aspects may be implemented using a method, a system, or a computer program, or any combination of systems, methods, and computer programs.

Other features and advantages will be apparent from the following description, including the drawings, and the claims.

DETAILED DESCRIPTION

Figure 1:
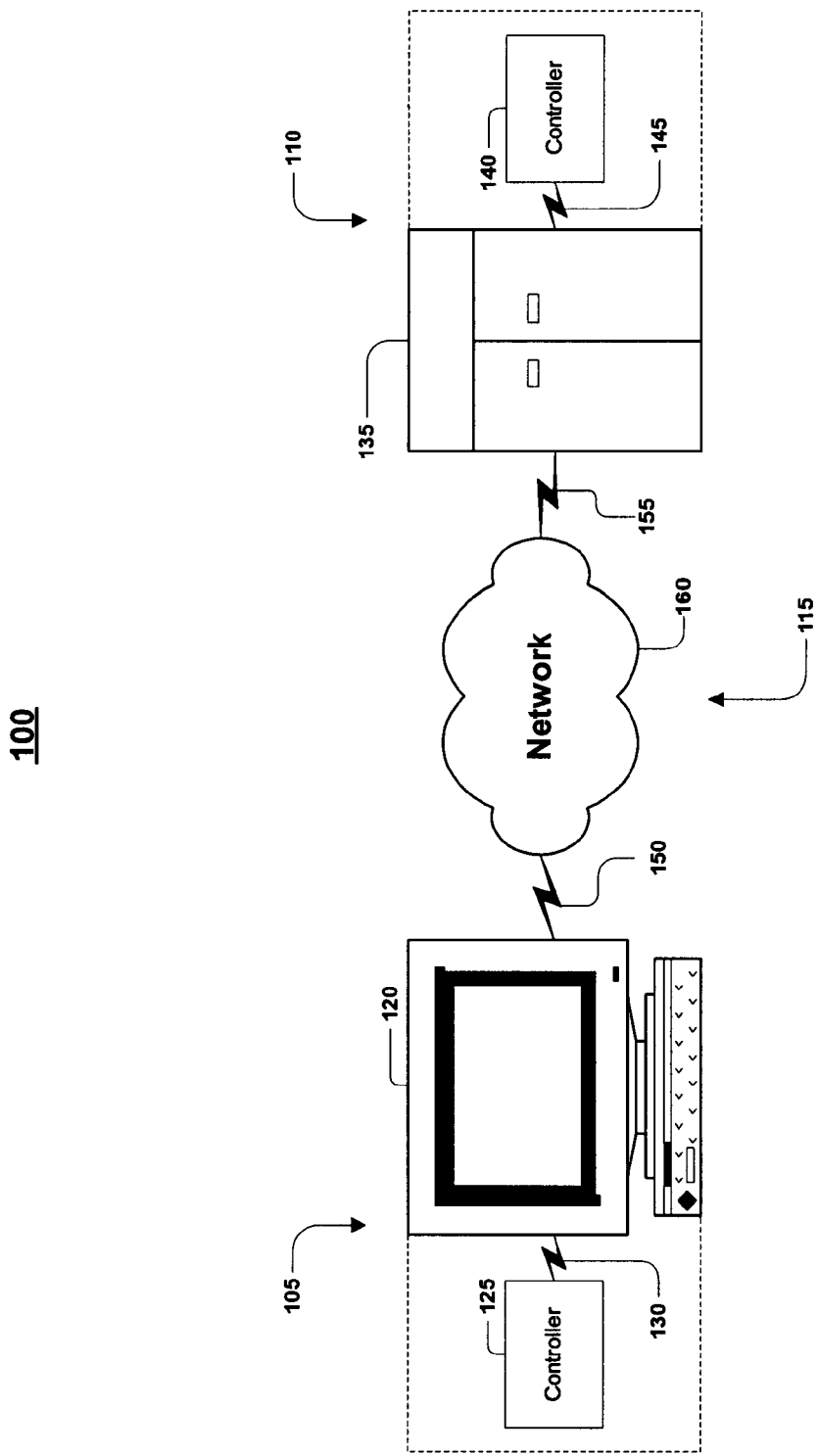
FIG. 1 is a block diagram of a communications system.

For illustrative purposes, FIGS. 1–6 show an example of a communications system for implementing techniques for transferring electronic data. For brevity, several elements in the figures described below are represented as monolithic entities. However, as would be understood by one skilled in the art, these elements each may include numerous interconnected computers and components designed to perform a set of specified operations and/or may be dedicated to a particular geographical region. Referring to FIG. 1, a communications system 100 is capable of delivering and exchanging data between a client system 105 and a host system 110 through a communications link 115. The client system 105 typically includes one or more client devices 120 and/or client controllers 125, and the host system 110 typically includes one or more host devices 135 and/or host controllers 140. For example, the client system 105 or the host system 110 may include one or more general-purpose computers (e.g., personal computers), one or more special-purpose computers (e.g., devices specifically programmed to communicate with each other and/or the client system 105 or the host system 110), or a combination of one or more general-purpose computers and one or more special-purpose computers. The client system 105 and the host system 110 may be arranged to operate within or in concert with one or more other systems, such as, for example, one or more LANs ("Local Area Networks") and/or one or more WANs ("Wide Area Networks").

The client device 120 (or the host device 135) is generally capable of executing instructions under the command of a client controller 125 (or a host controller 140). The client device 120 (or the host device 135) is connected to the client controller 125 (or the host controller 140) by a wired or wireless data pathway 130 or 145 capable of delivering data.

The client device 120, the client controller 125, the host device 135, and the host controller 140 each typically include one or more hardware components and/or software components. An example of a client device 120 or a host device 135 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions. The client device 120 and the host device 135 may include devices that are capable of peer-to-peer communications.

An example of client controller 125 or a host controller 140 is a software application loaded on the client device 120 or the host device 135 for commanding and directing communications enabled by the client device 120 or the host device 135. Other examples include a program, a piece of code, an instruction, a device, a computer, a computer system, or a combination thereof, for independently or collectively instructing the client device 120 or the host device 135 to interact and operate as described. The client controller 125 and the host controller 140 may be embodied permanently or temporarily in any type of machine, component, physical or virtual equipment, storage medium, or propagated signal capable of providing instructions to the client device 120 or the host device 135.

The communications link 115 typically includes a delivery network 160 making a direct or indirect communication between the client system 105 and the host system 110, irrespective of physical separation. Examples of a delivery network 160 include the Internet, the World Wide Web, WANs, LANs, analog or digital wired and wireless telephone networks (e.g. PSTN, ISDN, and XDSL), radio, television, cable, satellite, and/ or any other delivery mechanism for carrying data. The communications link 115 may include communication pathways 150, 155 that enable communications through the one or more delivery networks 160 described above. Each of the communication pathways 150, 155 may include, for example, a wired, wireless, cable or satellite communication pathway.

Figure 2:
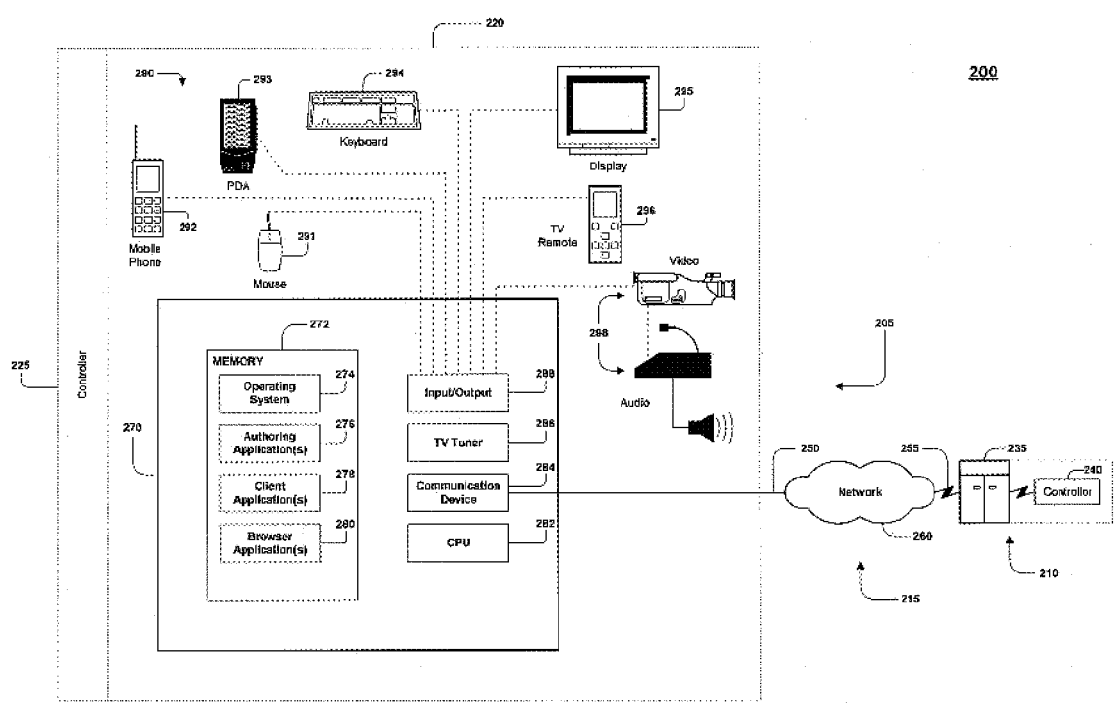
FIGS. 2–6 are block diagrams of expansions of aspects the block diagram of FIG. 1.

FIG. 2 illustrates a communications system 200 including a client system 205 communicating with a host system 210 through a communications link 215. Client system 205 typically includes one or more client devices 220 and one or more client controllers 225 for controlling the client devices 220. Host system 210 typically includes one or more host devices 235 and one or more host controllers 240 for controlling the host devices 235. The communications link 215 may include communication pathways 250, 255 enabling communications through the one or more delivery networks 260.

Examples of each element within the communications system of FIG. 2 are broadly described above with respect to FIG. 1. In particular, the host system 210 and communications link 215 typically have attributes comparable to those described with respect to host system 110 and communications link 115 of FIG. 1. Likewise, the client system 205 of FIG. 2 typically has attributes comparable to and illustrates one possible implementation of the client system 105 of FIG. 1.

The client device 220 typically includes a general-purpose computer 270 having an internal or external storage 272 for storing data and programs such as an operating system 274 (e.g., DOS, Windows™, Windows 95™, Windows 98™, Windows 2000™, Windows Me™, Windows XP™, Windows NT™, OS/2, or Linux) and one or more application programs. Examples of application programs include authoring applications 276 (e.g., word processing, database programs, spreadsheet programs, or graphics programs) capable of generating documents or other electronic content; client applications 278 (e.g., AOL client, CompuServe client, AIM client, AOL TV client, or ISP client) capable of communicating with other computer users, accessing various computer resources, and viewing, creating, or otherwise manipulating electronic content; and browser applications 280 (e.g., Netscape's Navigator or Microsoft's Internet Explorer) capable of rendering standard Internet content.

The general-purpose computer 270 also includes a central processing unit 282 (CPU) for executing instructions in response to commands from the client controller 225. In one implementation, the client controller 225 includes one or more of the application programs installed on the internal or external storage 272 of the general-purpose computer 270. In another implementation, the client controller 225 includes application programs externally stored in and performed by one or more device(s) external to the general-purpose computer 270.

The general-purpose computer typically will include a communication device 284 for sending and receiving data. One example of the communication device 284 is a modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a TV ("television") tuner 286 for receiving television programming in the form of broadcast, satellite, and/or cable TV signals. As a result, the client device 220 can selectively and/or simultaneously display network content received by communications device 284 and television programming content received by the TV tuner 286.

The general-purpose computer 270 typically will include an input/output interface 288 for wired or wireless connection to various peripheral devices 290. Examples of peripheral devices 290 include, but are not limited to, a mouse 291, a mobile phone 292, a personal digital assistant 293 (PDA), an MP3 player (not shown), a keyboard 294, a display monitor 295 with or without a touch screen input, a TV remote control 296 for receiving information from and rendering information to subscribers, and an audiovisual input device 298.

Although FIG. 2 illustrates devices such as a mobile telephone 292, a PDA 293, an MP3 player (not shown), and a TV remote control 296 as being peripheral with respect to the general-purpose computer 270, in another implementation, such devices may themselves include the functionality of the general-purpose computer 270 and operate as the client device 220. For example, the mobile phone 292 or the PDA 293 may include computing and networking capabilities and function as a client device 220 by accessing the delivery network 260 and communicating with the host system 210. Furthermore, the client system 205 may include one, some or all of the components and devices described above.

Figure 3:
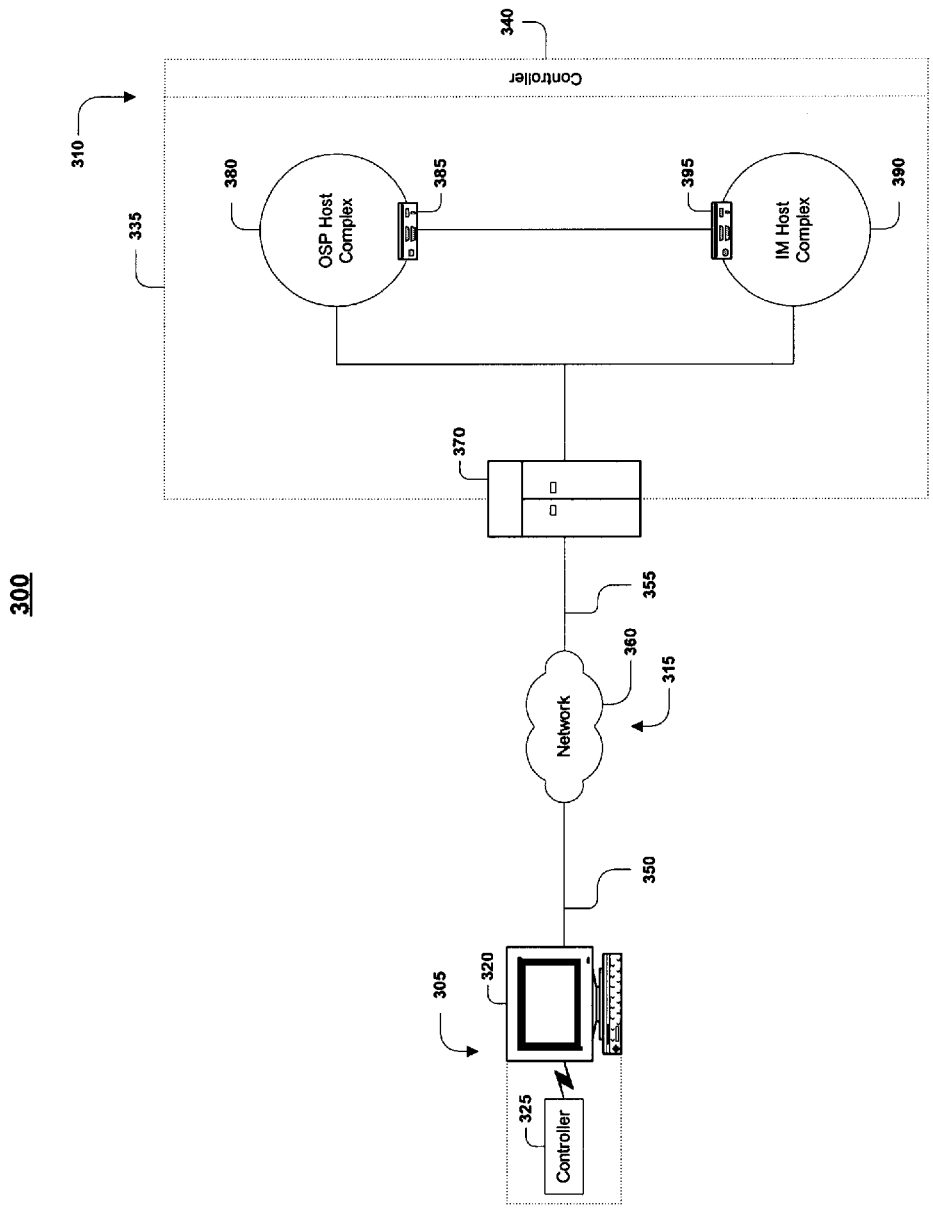

Referring to FIG. 3, a communications system 300 is capable of delivering and exchanging information between a client system 305 and a host system 310 through a communication link 315. Client system 305 typically includes one or more client devices 320 and one or more client controllers 325 for controlling the client devices 320. Host system 310 typically includes one or more host devices 335 and one or more host controllers 340 for controlling the host devices 335. The communications link 315 may include communication pathways 350, 355 enabling communications through the one or more delivery networks 360.

Examples of each element within the communications system of FIG. 3 are broadly described above with respect to FIGS. 1 and 2. In particular, the client system 305 and the communications link 315 typically have attributes comparable to those described with respect to client systems 105 and 205 and communications links 115 and 215 of FIGS. 1 and 2. Likewise, the host system 310 of FIG. 3 may have attributes comparable to and illustrates one possible implementation of the host systems 110 and 210 shown in FIGS. 1 and 2.

The host system 310 includes a host device 335 and a host controller 340. The host controller 340 is generally capable of transmitting instructions to any or all of the elements of the host device 335. For example, in one implementation, the host controller 340 includes one or more software applications loaded on the host device 335. In other implementations, as described above, the host controller 340 may include any of several other programs, machines, and devices operating independently or collectively to control the host device 335.

The host device 335 includes a login server 370 for enabling access by subscribers and for routing communications between the client system 305 and other elements of the host device 335. The host device 335 also includes various host complexes such as the depicted OSP ("Online Service Provider") host complex 380 and IM ("Instant Messaging") host complex 390. To enable access to these host complexes by subscribers, the client system 305 includes communication software, for example, an OSP client application and an IM client application. The OSP and IM communication software applications are designed to facilitate the subscriber's interactions with the respective services and, in particular, may provide access to all the services available within the respective host complexes.

Typically, the OSP host complex 380 supports different services, such as email, discussion groups, chat, news services, and Internet access. The OSP host complex 380 is generally designed with an architecture that enables the machines within the OSP host complex 380 to communicate with each other and employs certain protocols (i.e., standards, formats, conventions, rules, and structures) to transfer data. The OSP host complex 380 ordinarily employs one or more OSP protocols and custom dialing engines to enable access by selected client applications. The OSP host complex 380 may define one or more specific protocols for each service based on a common, underlying proprietary protocol.

The IM host complex 390 is generally independent of the OSP host complex 380, and supports instant messaging services irrespective of a subscriber's network or Internet access. Thus, the IM host complex 390 allows subscribers to send and receive instant messages, whether or not they have access to any particular ISP. The IM host complex 390 may support associated services, such as administrative matters, advertising, directory services, chat, and interest groups related to the instant messaging. The IM host complex 390 has an architecture that enables all of the machines within the IM host complex to communicate with each other. To transfer data, the IM host complex 390 employs one or more standard or exclusive IM protocols.

The host device 335 may include one or more gateways that connect and therefore link complexes, such as the OSP host complex gateway 385 and the IM host complex gateway 395. The OSP host complex gateway 385 and the IM host complex gateway 395 may directly or indirectly link the OSP host complex 380 with the IM host complex 390 through a wired or wireless pathway. Ordinarily, when used to facilitate a link between complexes, the OSP host complex gateway. 385 and the IM host complex gateway 395 are privy to information regarding the protocol type anticipated by a destination complex, which enables any necessary protocol conversion to be performed incident to the transfer of data from one complex to another. For instance, the OSP host complex 380 and IM host complex 390 generally use different protocols such that transferring data between the complexes requires protocol conversion by or at the request of the OSP host complex gateway 385 and/or the IM host complex gateway 395.

Figure 4:
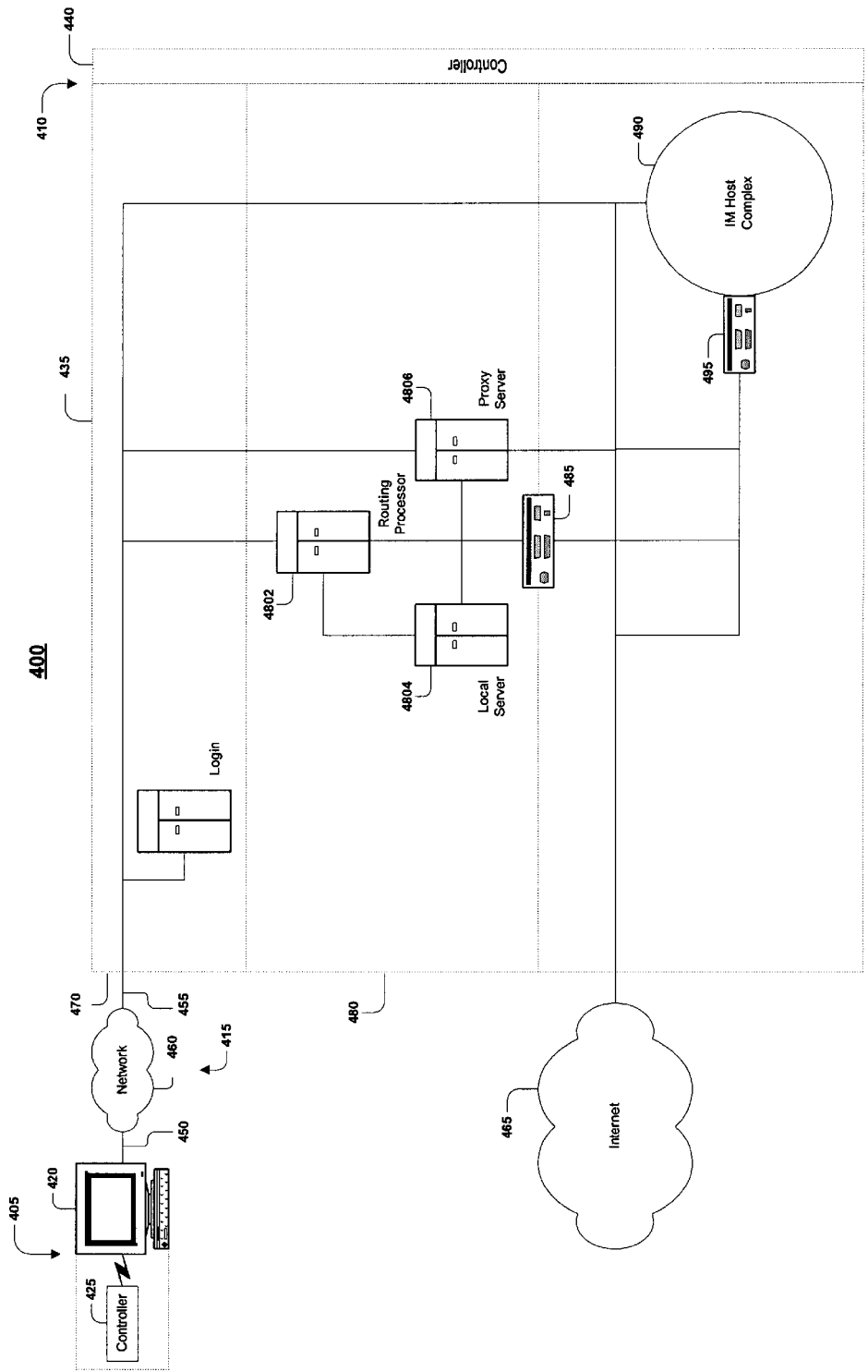

Referring to FIG. 4, a communications system 400 is capable of delivering and exchanging information between a client system 405 and a host system 410 through a communication link 415. Client system 405 typically includes one or more client devices 420 and one or more client controllers 425 for controlling the client devices 420. Host system 410 typically includes one or more host devices 435 and one or more host controllers 440 for controlling the host devices 435. The communications link 415 may include communication pathways 450, 455 enabling communications through the one or more delivery networks 460. As shown, the client system 405 may access the Internet 465 through the host system 410.

Examples of each element within the communications system of FIG. 4 are broadly described above with respect to FIGS. 1–3. In particular, the client system 405 and the communications link 415 typically have attributes comparable to those described with respect to client systems 105, 205, and 305 and communications links 115, 215, and 315 of FIGS. 1–3. Likewise, the host system 410 of FIG. 4 may have attributes comparable to and illustrates one possible implementation of the host systems 110, 210, and 310 shown in FIGS. 1–3. FIG. 4 describes an aspect of the host system 410, focusing primarily on one particular implementation of OSP host complex 480.

The client system 405 includes a client device 420 and a client controller 425. The client controller 425 is generally capable of establishing a connection to the host system 410, including the OSP host complex 480, the IM host complex 490 and/or the Internet 465. In one implementation, the client controller 425 includes an OSP application for communicating with servers in the OSP host complex 480 using exclusive OSP protocols. The client controller 425 also may include applications, such as an IM client application, and/or an Internet browser application, for communicating with the IM host complex 490 and the Internet 465.

The host system 410 includes a host device 435 and a host controller 440. The host controller 440 is generally capable of transmitting instructions to any or all of the elements of the host device 435. For example, in one implementation, the host controller 440 includes one or more software applications loaded on one or more elements of the host device 435. In other implementations, as described above, the host controller 440 may include any of several other programs, machines, and devices operating independently or collectively to control the host device 435.

The host system 410 includes a login server 470 capable of enabling communications with and authorizing access by client systems 405 to various elements of the host system 410, including an OSP host complex 480 and an IM host complex 490. The login server 470 may implement one or more authorization procedures to enable simultaneous access to the OSP host complex 480 and the IM host complex 490. The OSP host complex 480 and the IM host complex 490 are connected through one or more OSP host complex gateways 485 and one or more IM host complex gateways 495. Each OSP host complex gateway 485 and IM host complex gateway 495 may perform any protocol conversions necessary to enable communications between the OSP host complex 480, the IM host complex 490, and the Internet 465.

The OSP host complex 480 supports a set of services from one or more servers located internal to and external from the OSP host complex 480. Servers external to the OSP host complex 480 generally may be viewed as existing on the Internet 465. Servers internal to the OSP complex 480 may be arranged in one or more configurations. For example, servers may be arranged in centralized or localized clusters in order to distribute servers and subscribers within the OSP host complex 480.

In one implementation of FIG. 4, the OSP host complex 480 includes a routing processor 4802. In general, the routing processor 4802 will examine an address field of a data request, use a mapping table to determine the appropriate destination for the data request, and direct the data request to the appropriate destination. In a packet-based implementation, the client system 405 may generate information requests, convert the requests into data packets, sequence the data packets, perform error checking and other packet-switching techniques, and transmit the data packets to the routing processor 4802. Upon receiving data packets from the client system 405, the routing processor 4802 may directly or indirectly route the data packets to a specified destination within or outside of the OSP host complex 480. For example, in the event that a data request from the client system 405 can be satisfied locally, the routing processor 4802 may direct the data request to a local server 4804. In the event that the data request cannot be satisfied locally, the routing processor 4802 may direct the data request externally to the Internet 465 or the IM host complex 490 through the gateway 485.

The OSP host complex 480 also includes a proxy server 4806 for directing data requests and/or otherwise facilitating communication between the client system 405 and the Internet 465. The proxy server 4806 may include an IP ("Internet Protocol") tunnel for converting data from OSP protocol into standard Internet protocol and transmitting the data to the Internet 465. The IP tunnel also converts data received from the Internet 465 in the standard Internet protocol back into the OSP protocol and sends the converted data to the routing processor 4802 for delivery back to the client system 405.

The proxy server 4806 also may allow the client system 405 to use standard Internet protocols and formatting to access the OSP host complex 480 and the Internet 465. For example, the subscriber may use an OSP TV client application having an embedded browser application installed on the client system 405 to generate a request in standard Internet protocol, such as HTTP ("HyperText Transport Protocol"). In a packet-based implementation, data packets may be encapsulated inside a standard Internet tunneling protocol, such as, for example, UDP ("User Datagram Protocol") and routed to the proxy server 4806. The proxy server 4806 may include an L2TP ("Layer Two Tunneling Protocol") tunnel capable of establishing a point-to-point protocol (PPP) session with the client system 405.

The proxy server 4806 also may act as a buffer between the client system 405 and the Internet 465, and may implement content filtering and time saving techniques. For example, the proxy server 4806 can check parental controls settings of the client system 405 and request and transmit content from the Internet 465 according to the parental control settings. In addition, the proxy server 4806 may include one or more caches for storing frequently accessed information. If requested data is determined to be stored in the caches, the proxy server 4806 may send the information to the client system 405 from the caches and avoid the need to access the Internet 465.

Figure 5:
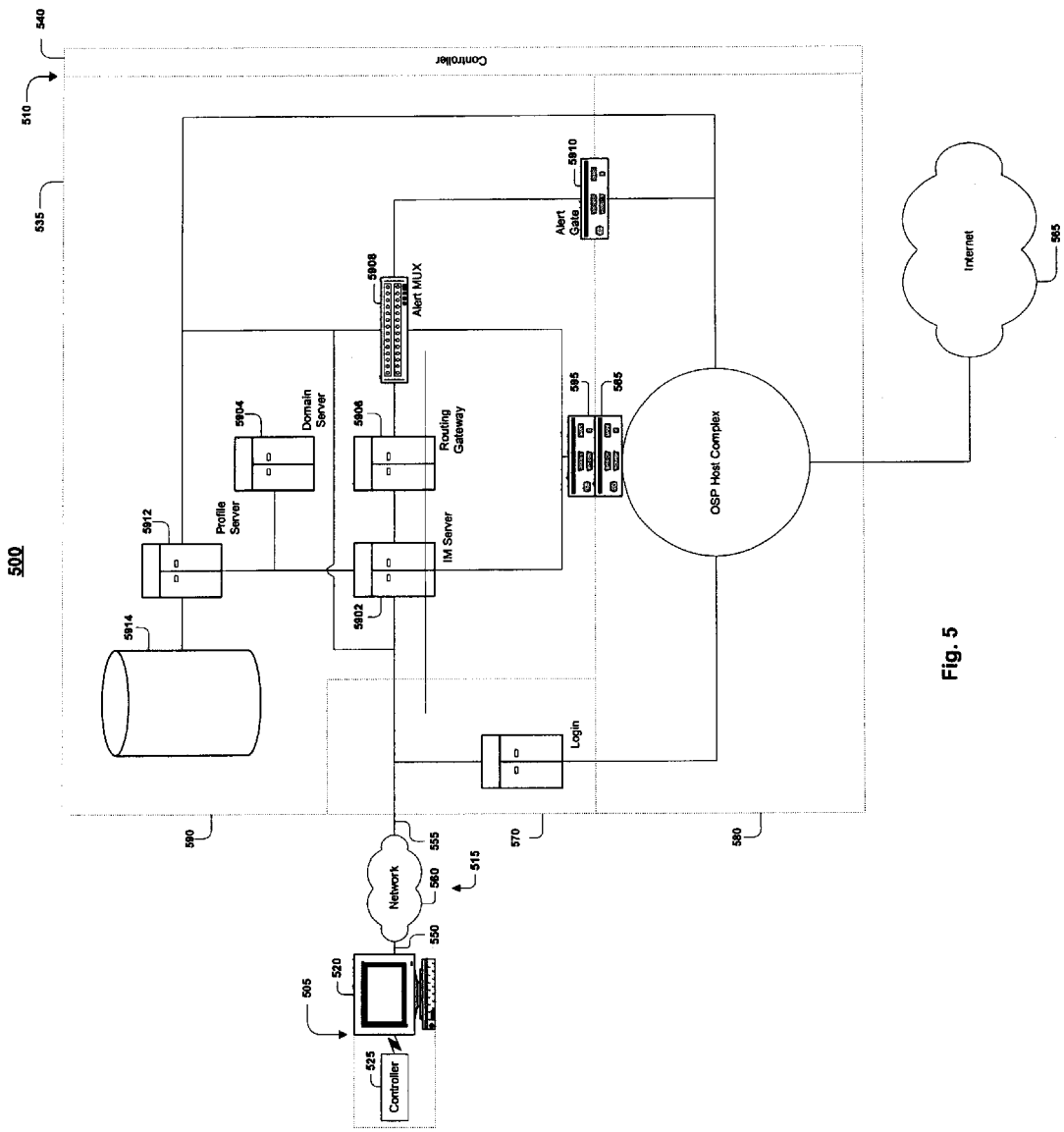

Referring to FIG. 5, a communications system 500 is capable of delivering and exchanging information between a client system 505 and a host system 510 through a communication link 515. Client system 505 typically includes one or more client devices 520 and one or more client controllers 525 for controlling the client devices 520. Host system 510 typically includes one or more host devices 535 and one or more host controllers 540 for controlling the host devices 535. The communications link 515 may include communication pathways 550, 555 enabling communications through the one or more delivery networks 560. As shown, the client system 505 may access the Internet 565 through the host system 510.

Examples of each element within the communications system of FIG. 5 are broadly described above with respect to FIGS. 1–4. In particular, the client system 505 and the communications link 515 typically have attributes comparable to those described with respect to client systems 105, 205, 305, and 405 and communications links 115, 215, 315, and 415 of FIGS. 1–4. Likewise, the host system 510 of FIG. 5 may have attributes comparable to and illustrates one possible implementation of the host systems 110, 210, 310, and 410 shown in FIGS. 1–4. FIG. 5 describes an aspect of the host system 510, focusing primarily on one particular implementation of IM host complex 590.

The client system 505 includes a client device 520 and a client controller 525. The client controller 525 is generally capable of establishing a connection to the host system 510, including the OSP host complex 580, the IM host complex 590 and/or the Internet 565. In one implementation, the client controller 525 includes an IM application for communicating with servers in the IM host complex 590 utilizing exclusive IM protocols. The client controller 525 also may include applications, such as an OSP client application, and/or an Internet browser application for communicating with the OSP host complex 580 and the Internet 565, respectively.

The host system 510 includes a host device 535 and a host controller 540. The host controller 540 is generally capable of transmitting instructions to any or all of the elements of the host device 535. For example, in one implementation, the host controller 540 includes one or more software applications loaded on one or more elements of the host device 535. However, in other implementations, as described above, the host controller 540 may include any of several other programs, machines, and devices operating independently or collectively to control the host device 535.

The host system 510 includes a login server 570 capable of enabling communications with and authorizing access by client systems 505 to various elements of the host system 510, including an OSP host complex 580 and an IM host complex 590. The login server 570 may implement one or more authorization procedures to enable simultaneous access to the OSP host complex 580 and the IM host complex 590. The OSP host complex 580 and the IM host complex 590 are connected through one or more OSP host complex gateways 585 and one or more IM host complex gateways 595. Each OSP host complex gateway 585 and IM host complex gateway 595 may perform any protocol conversions necessary to enable communication between the OSP host complex 580, the IM host complex 590, and the Internet 565.

To access the IM host complex 590 to begin an instant messaging session, the client system 505 establishes a connection to the login server 570. The login server 570 typically determines whether the particular subscriber is authorized to access the IM host complex 590 by verifying a subscriber identification and password. If the subscriber is authorized to access the IM host complex 590, the login server 570 employs a hashing technique on the subscriber's screen name to identify a particular IM server 5902 for use during the subscriber's session. The login server 570 provides the client system 505 with the IP address of the particular IM server 5902, gives the client system 505 an encrypted key (i.e., a cookie), and breaks the connection. The client system 505 then uses the IP address to establish a connection to the particular IM server 5902 through the communications link 515, and obtains access to that IM server 5902 using the encrypted key. Typically, the client system 505 will be equipped with a Winsock API ("Application Programming Interface") that enables the client system 505 to establish an open TCP connection to the IM server 5902.

Once a connection to the IM server 5902 has been established, the client system 505 may directly or indirectly transmit data to and access content from the IM server 5902 and one or more associated domain servers 5904. The IM server 5902 supports the fundamental instant messaging services and the domain servers 5904 may support associated services, such as, for example, administrative matters, directory services, chat and interest groups. In general, the purpose of the domain servers 5904 is to lighten the load placed on the IM server 5902 by assuming responsibility for some of the services within the IM host complex 590. By accessing the IM server 5902 and/or the domain server 5904, a subscriber can use the IM client application to view whether particular subscribers ("buddies") are online, exchange instant messages with particular subscribers, participate in group chat rooms, trade files such as pictures, invitations or documents, find other subscribers with similar interests, get customized news and stock quotes, and search the World Wide Web.

In the implementation of FIG. 5, the IM server 5902 is directly or indirectly connected to a routing gateway 5906. The routing gateway 5906 facilitates the connection between the IM server 5902 and one or more alert multiplexors 5908, for example, by serving as a link minimization tool or hub to connect several IM servers 5902 to several alert multiplexors 5908. In general, an alert multiplexor 5908 maintains a record of alerts and subscribers registered to receive the alerts.

Once the client system 505 is connected to the alert multiplexor 5908, a subscriber can register for and/or receive one or more types of alerts. The connection pathway between the client system 505 and the alert multiplexor 5908 is determined by employing another hashing technique at the IM server 5902 to identify the particular alert multiplexor 5908 to be used for the subscriber's session. Once the particular multiplexor 5908 has been identified, the IM server 5902 provides the client system 505 with the IP address of the particular alert multiplexor 5908 and gives the client system 505 an encrypted key (i.e., a cookie). The client system 505 then uses the IP address to connect to the particular alert multiplexor 5908 through the communication link 515 and obtains access to the alert multiplexor 5908 using the encrypted key.

The alert multiplexor 5908 is connected to an alert gate 5910 that, like the IM host complex gateway 595, is capable of performing the necessary protocol conversions to form a bridge to the OSP host complex 580. The alert gate 5910 is the interface between the IM host complex 590 and the physical servers, such as servers in the OSP host complex 580, where state changes are occurring. In general, the information regarding state changes will be gathered and used by the IM host complex 590. However, the alert multiplexor 5908 also may communicate with the OSP host complex 580 through the IM host complex gateway 595, for example, to provide the servers and subscribers of the OSP host complex 580 with certain information gathered from the alert gate 5910.

The alert gate 5910 can detect an alert feed corresponding to a particular type of alert. The alert gate 5910 may include a piece of code (alert receive code) capable of interacting with another piece of code (alert broadcast code) on the physical server where a state change occurs. In general, the alert receive code installed on the alert gate 5910 instructs the alert broadcast code installed on the physical server to send an alert feed to the alert gate 5910 upon the occurrence of a particular state change. Upon detecting an alert feed, the alert gate 5910 contacts the alert multiplexor 5908, which in turn, informs the client system 505 of the detected alert feed.

In the implementation of FIG. 5, the IM host complex 590 also includes a subscriber profile server 5912 connected to a database 5914 for storing large amounts of subscriber profile data. The subscriber profile server 5912 may be used to enter, retrieve, edit, manipulate, or otherwise process subscriber profile data. In one implementation, a subscriber's profile data includes, for example, the subscriber's buddy list, alert preferences, designated stocks, identified interests, and geographic location. The subscriber may enter, edit and/or delete profile data using an installed IM client application on the client system 505 to interact with the subscriber profile server 5912.

Because the subscriber's data is stored in the IM host complex 590, the subscriber does not have to reenter or update such information in the event that the subscriber accesses the IM host complex 590 using a new or a different client system 505. Accordingly, when a subscriber accesses the IM host complex 590, the IM server 5902 can instruct the subscriber profile server 5912 to retrieve the subscriber's profile data from the database 5914 and to provide, for example, the subscriber's buddy list to the IM server 5902 and the subscriber's alert preferences to the alert multiplexor 5908. The subscriber profile server 5912 also may communicate with other servers in the OSP host complex 580 to share subscriber profile data with other services. Alternatively, user profile data may be saved locally on the client device 505.

Figure 6:
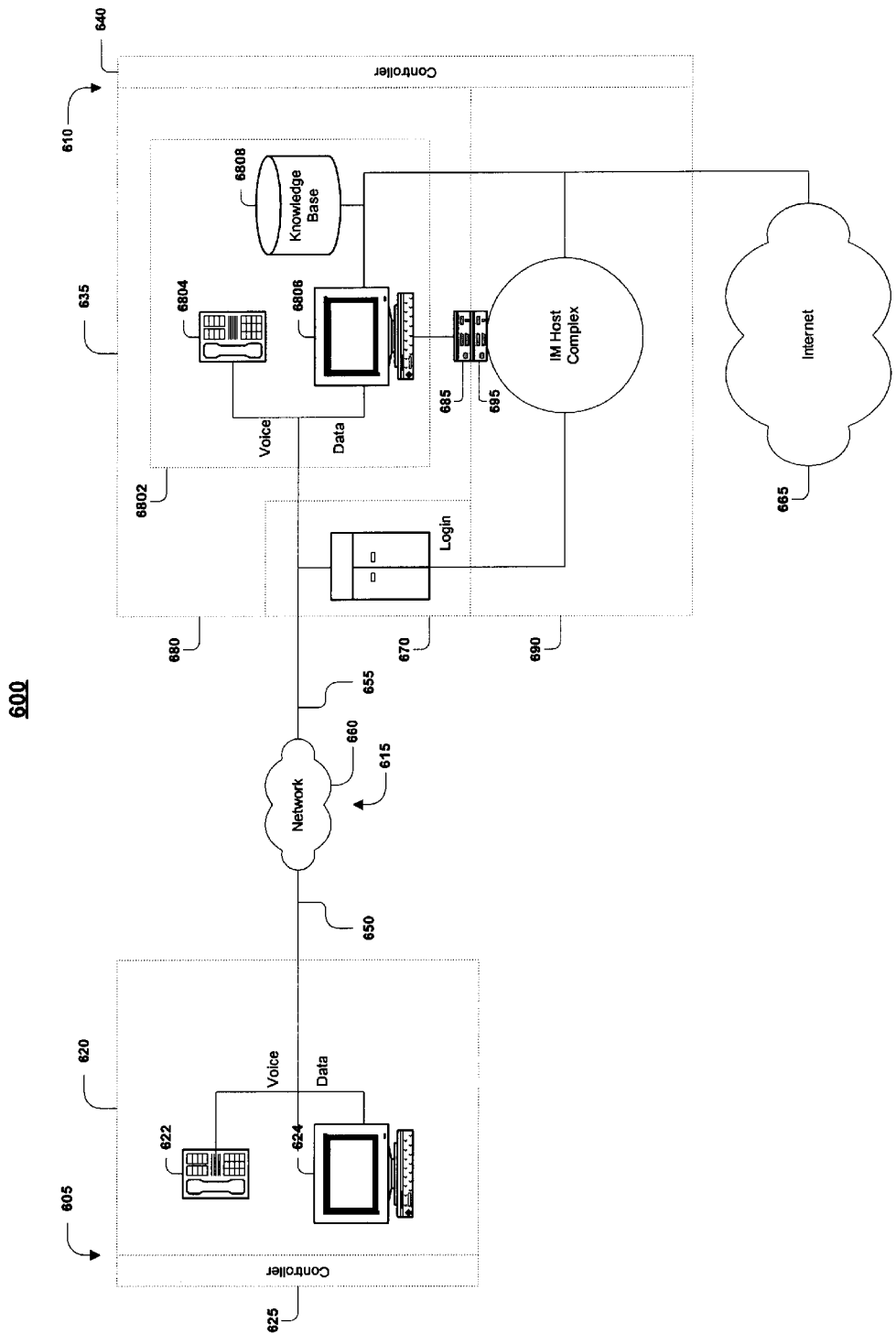

Referring to FIG. 6, a communications system 600 is capable of delivering and exchanging information between a client system 605 and a host system 610 through a communication link 615. Client system 605 typically includes one or more client devices 620 and one or more client controllers 625 for controlling the client devices 620. Host system 610 typically includes one or more host devices 635 and one or more host controllers 640 for controlling the host devices 635. The communication link 615 may include one or more delivery networks 660. A network 660 may be any known or described delivery network including, but not limited to, a telephone network and/or the Internet. The communications system 600 may be implemented as part of the communications system described above with reference to FIGS. 1–5.

Examples of each element within the communication system of FIG. 6 are broadly described above with respect to FIGS. 1–5. In particular, the client system 605 and the communications link 615 typically have attributes comparable to those described with respect to client systems 105, 205, 305, 405, and 505 and communications links 115, 215, 315, 415, and 515 of FIGS. 1–5. Likewise, the host system 610 of FIG. 6 may have attributes comparable to the host systems 110, 210, 310, 410, and 510 shown in FIGS. 1–5. FIG. 6 illustrates one possible implementation of those systems.

The client system 605 is configured to exchange voice communications and data communications with the host system 610 through the network 615. In one implementation, the client system 605 and/or the client device 620 includes a voice communication device 622 such as, for example, a landline telephone or wireless telephone. The client system 605 and/or the client device 620 also includes a data communication device 624 such as, for example, a personal computer system, a workstation, or another device capable of communicating and exchanging data with an OSP.

The host system 610 and/or host device 635 includes a login server 670 capable of enabling communications with and authorizing access by the client system 605 to various elements of the host system 610, including an OSP host complex 680 and an IM host complex 690. The login server 670 may implement one or more authorization procedures to enable simultaneous access to the OSP host complex 680 and the IM host complex 690. The OSP host complex 680 and the IM host complex 690 are connected through one or more OSP host complex gateways 685 and one or more IM host complex gateways 695. Each OSP host complex gateway 685 and IM host complex gateway 695 may perform any protocol conversions necessary to enable communication between the OSP host complex 680, the IM host complex 690, and the Internet 665.

The host system 610 and/or host device 635 also includes a customer server center 6802. The customer service center 6802 is configured to communicate with the client system 605 over the network 615 and to receive voice communications and data communications. In the implementation of FIG. 6, the customer service center 6802 is located in the OSP host complex 680. In other implementations, however, the customer service center 6802 may be located in the IM host complex 690 and/or on the Internet 665.

The customer service center 6802 may receive voice communication at a voice communications device 6804 and may receive data communications at a data communications device 6806. Examples of voice communication device 6804 include, but are not limited to, wireless and landline telephone systems and equipment, and examples of data communications device 6806 include, but are not limited to, a troubleshooting computer system, workstation, or other device programmed to analyze problems and/or provide customer service.

The voice communications device 6804 and/or the data communications device 6806 may be configured to communicate with a knowledge base 6808. The knowledge base 6808 may include internal and/or external storage media, such as, for example, electrical, magnetic, and/or optical storage media. In one implementation, the knowledge base 6808 stores troubleshooting databases and/or solution flows for analyzing problems and recommending solutions to technical problems. Examples of troubleshooting databases, include, but are not limited to, relational databases, hierarchical databases, and/or object-oriented databases. The knowledge base 6808 may be a single physical or logical structure, or may be an interconnected network of several accessible databases. The knowledge base 6808 may include meta-data descriptive of its contents to facilitate searching and accessing stored data.

The customer service center 6802 may include one or more interconnected systems, such as, for example, one or more Local Area Networks ("LANs") and/or Wide Area Networks ("WANs"). In one implementation, the customer service center 6802 includes a network of Customer Care Consultant ("CCC") stations structured and arranged to provide customer service in response to subscriber-reported problems. One or more voice communications devices 6804, data communications devices 6806, and/or knowledge bases 6808 may be dedicated to a particular CCC station.

The network 615 may be structured to provide computer telephone integration ("CTI") so that voice and/or other data may be communicated over the network 615. The network 615 typically allows direct or indirect communication between parties, irrespective of physical separation. The network 615 may include various mechanisms for delivering voice and/or other data, such as, for example, analog or digital wired and wireless telephone networks, e.g., public switched telephone networks (PSTN), integrated services digital networks (ISDN), all types of digital subscriber lines (xDSL), advance mobile telephone service (AMPS), global system for mobile communications (GSM), or code division multiple access (CDMA). The network also may include the Internet, the World Wide Web, one or more local area networks (LANs) and/or one or more wide area networks (WANs), radio, cable, satellite, and/or any other delivery mechanism for carrying voice or other data.

Figure 7:
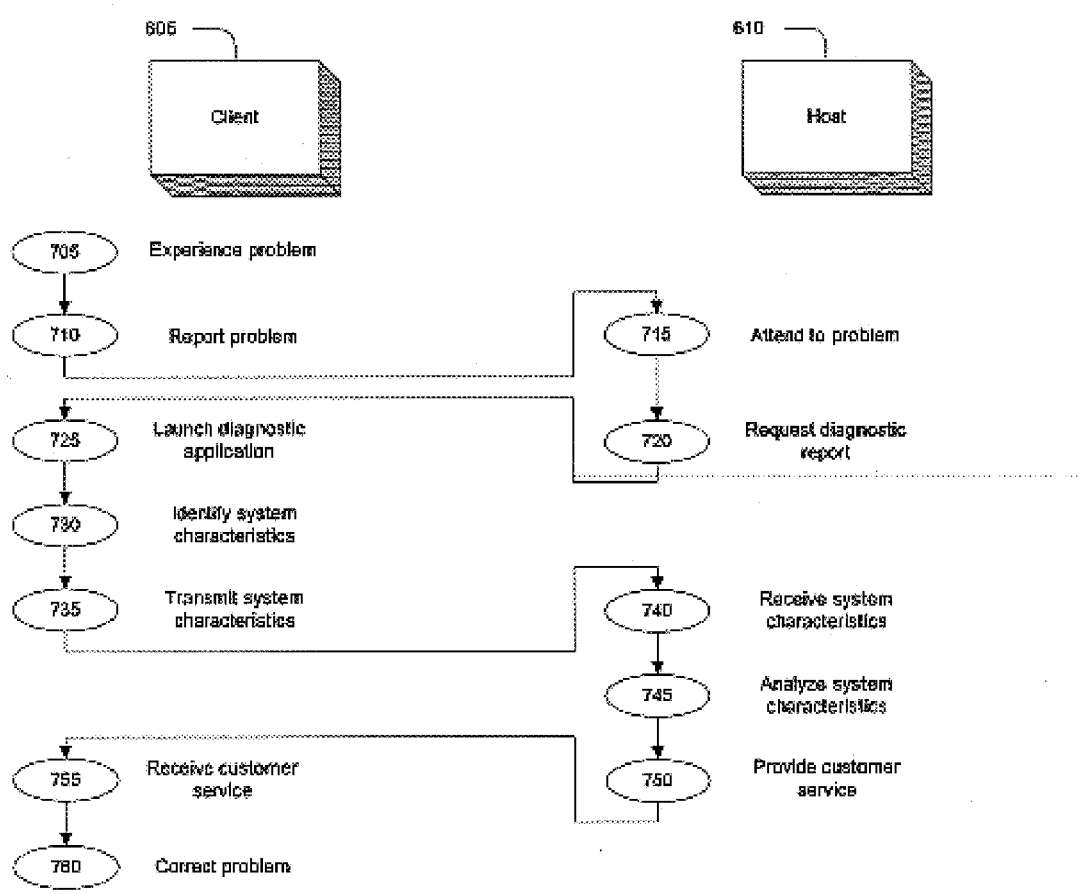
FIG. 7 is a flow chart of a communications method that may be implemented by the systems of FIGS. 1–6.

An exemplary process 700 for providing customer service to a subscriber of a communications system is shown in FIG. 7. In one implementation, the process 700 is implemented on the communications system 600 of FIG. 6.

Initially, the client system 605 experiences a problem (step 705) and reports the problem to the host system 610 (step 710). For example, while using the client 605, a subscriber may encounter a variety of technical complexities relating to the operation of computer hardware and/or software. A subscriber may report the problem, using voice communication, e-mail, instant messaging, a chat-room, any other suitable method, and/or a combination of methods. For example, a subscriber may send e-mail and/or instant messages to a CCC station while talking to a consultant on a telephone.

Upon notification, the host 610 attends to the problem reported by the client system 605 (step 715). In one implementation, incoming voice and/or data communications from subscribers experiencing technical problems are received at a customer service center 6802 and routed to a CCC station. A subscriber may be routed to a particular CCC station and/or operator based on the type of technical problem. Alternatively, subscribers may be queued and routed to the next available CCC station in the customer service center 6802 on a first-come-first-serve basis.

The host system 610 requests a diagnostic report from the client 605 (step 720). Depending on the type of problem, a consultant at a CCC station may request the subscriber to execute a diagnostic program to assist in the provision of the desired customer service. A consultant may request a diagnostic report at the outset of any attention given to the subscriber's problem or at any point thereafter. In one implementation, to expedite the process 700, the subscriber is instructed to execute the diagnostic application by a recorded message played while the subscriber is waiting to speak with a live consultant. In another implementation, the subscriber is prompted to attach and/or include a diagnostic report in any request for technical assistance.

The client 605 launches the diagnostic program (step 725). A subscriber may execute the diagnostic program, for example, by a keyboard command, by a graphical user interface, or by an other suitable method. The diagnostic program also is stored on an internal or an external disk drive to the client system 605. The diagnostic application may reside, for example, elsewhere on the client device 605, the host device 635, and/or the Internet 665.

Upon launch and execution, the diagnostic program identifies certain predetermined characteristics of the client system 605 (step 730). The diagnostic program may, for example, load dynamic link libraries ("dlls") having a predetermined extension to identify the system characteristics. The diagnostic program may contain one or more executable files for creating an output file. The executable files may include embedded or dynamically loaded tabs containing user interfaces ("UIs") and logic for implementing specific functionality for the tabs. In one implementation, the diagnostic program, when executed, identifies system characteristics of the client system 605 and generates an output file containing the system characteristics. The output file may be stored in a computer-readable medium such as a data file, in memory, on a disk drive, on an external storage medium, and/or on an internal storage medium.

The system characteristics identified by the diagnostic application may include, for example, characteristics regarding the hardware and/or software components of the client system 605. The following is an exemplary listing of characteristics that may be identified by the diagnostic application: hard drive information, operating system information, installed memory information, systems resources information, browser information, monitor information, multimedia capability information, pathname information, client version information, client status information, modem information, and utility information.

Hard drive information may include, for example, information related to the disk drive of the client system 605, such as a directory of available disk drives and logical disk drives, the drive type of each disk drive, the total space of a disk drive, and/or free space of a disk drive.

Operating system information may include, for example, information related to the version and/or build of an operating system installed on the client system 605.

Processor information, may include, for example, information related to the make, model, and speed of a processor of the client system 605.

Installed memory information may include, for example, information related to the random access memory ("RAM") installed on the client system 605, such as the total system memory capacity and/or the percentage of memory being used.

System resources information may include, for example, information related to available resources of the client system 605, such as the percentage free of a particular resource and/or the percentage free of total resources.

Browser information may include, for example, information related to a browser application installed on the client system 605, such as the version and/or revision of the browser application.

Monitor information may include, for example, information related to a monitor of the client system 605, such as the resolution of a monitor and/or the depth of a monitor.

Multimedia capability information may include, for example, information related to multimedia capability of the client system 605, such as a listing of available devices to support sound and/or video.

Pathname information may include, for example, information related to the pathname of a computer application launched by the client system 605, such as the location of a file and/or folder storing the most recently launched version of a computer application (e.g., OSP client).

Client version information may include, for example, information related to a computer application (e.g., browser application, OSP client application) installed on the client system 605, such as the date of installation of the application and the current version of the application.

Client status information may include, for example, information about the past and/or present status of the client system 605, such as a list of recent error messages, a list of installed updates, session information, number of application launches, number of logged on sessions, or number of tray launches, exits from a computer program, percentage of abnormally disconnected sessions, and number or percentage of abnormal shutdowns of an operating system.

Modem information may include, for example, information about a modem of the client system 605, such as the make and/or model of a modem device, a list of all available modem devices, modem initialization strings, a list of available ports, the address of a port, and the highest speed supported by a port.

Utility information may include, for example, information related to utilities of the client system 605, such as the location of a browser cache, the current size of the browser cache, the maximum size of the browser cache, the current color mode, and the presence and/or status of an Internet adapter.

The client 605 transmits the system characteristics to the host system 610 (step 735). For example, the client system 605 may directly transfer an output file containing the system characteristics to the host system 610 over a peer-to-peer connection. Alternatively, the output file may be sent over the Internet in the body of or an attachment to an e-mail message or instant message and/or in an online chat room. The system characteristics also may be transmitted by voice communication, facsimile, or same other suitable way. The system characteristics may be transmitted directly to the host system 610 from the client 605 and/or indirectly through an intermediary and/or proxy.

The host system 610 receives the system characteristics from the client system 605 (step 740), for example, by direct file transfer, in an e-mail message, in an instant message, in an online chat room, by facsimile, and/or over the Internet. In response, the host 610 analyzes the system characteristics of the client system 605 (step 745) and provides customer service (step 750). The host system 610 may include software applications installed at a CCC station, for example, to facilitate analysis of and solutions to problems reported to the customer service center 6802. A human operator, i.e., consultant, at the CCC station may use available troubleshooting devices and/or software applications to analyze a subscriber's problem and render customer service. In one implementation, analysis of the system characteristics includes determining whether the client system 605 is in compliance with a recommended system requirement.

The client 605 receives customer service from the host 610 (step 755) and corrects the problem (step 760). The customer service received from the host 610 may include operations such as clearing a cache, installing software, updating software, or uninstalling software. Such operations may be performed under the control of the client system 605 and/or the host system 610. The remedial measures from the host 610. should be sufficient to correct common problems experienced by the client system 605.

Figure 8:
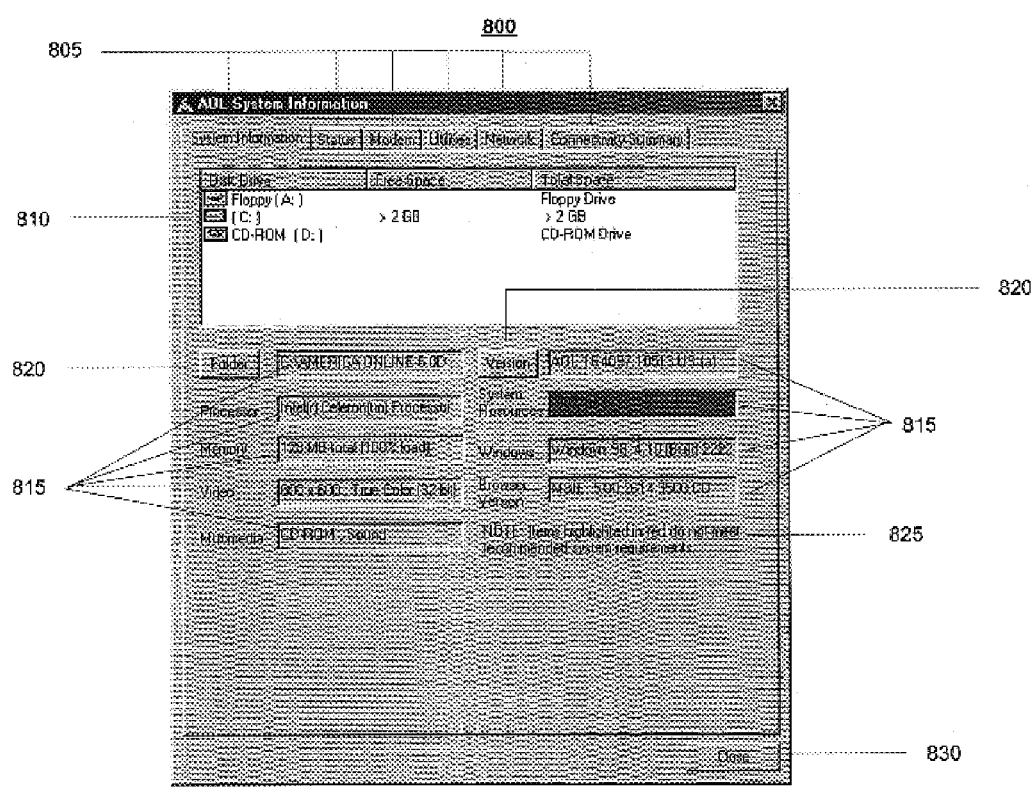
FIGS. 8–14 are illustrations of different graphical user interfaces that may be provided by the systems of FIGS. 1–6.

FIG. 8 is an example of a UI 800 that may be used to present the system characteristics of the client system 605. The UI 800 includes one or more tabs containing information about the system characteristics of the client device 605. Where there is more than one tab, each tab may present different information about the system characteristics of the client device 605. The UI 800 includes six tabs 805, labeled as "System Information," "Status," "Modem," "Utilities," "Network," and "Connectivity Summary." In this example, the content of the tab 805 labeled "System Information" is visible, and the content of other tabs is hidden.

The UI 800 includes a list control box 810 and edit boxes 815. The list control box 810 contains information concerning system characteristics such as disk drives, free space on a drive, and total space on a drive. The edit boxes 815 contain information concerning system characteristics such as the folder where an application is located, the version of an application, the processor, the status of system resources, total memory, available memory, operating system, video monitor information, browser version, and multimedia information. The UI 800 also includes buttons 820 that link a user to the folder where an application is located and launch an application. A note 825 including a text message flags items from the list control box 810 and/or edit box 820 that do not meet minimum recommended parameters. A close button 830 allows a user to close the UI 800.

Figure 9:
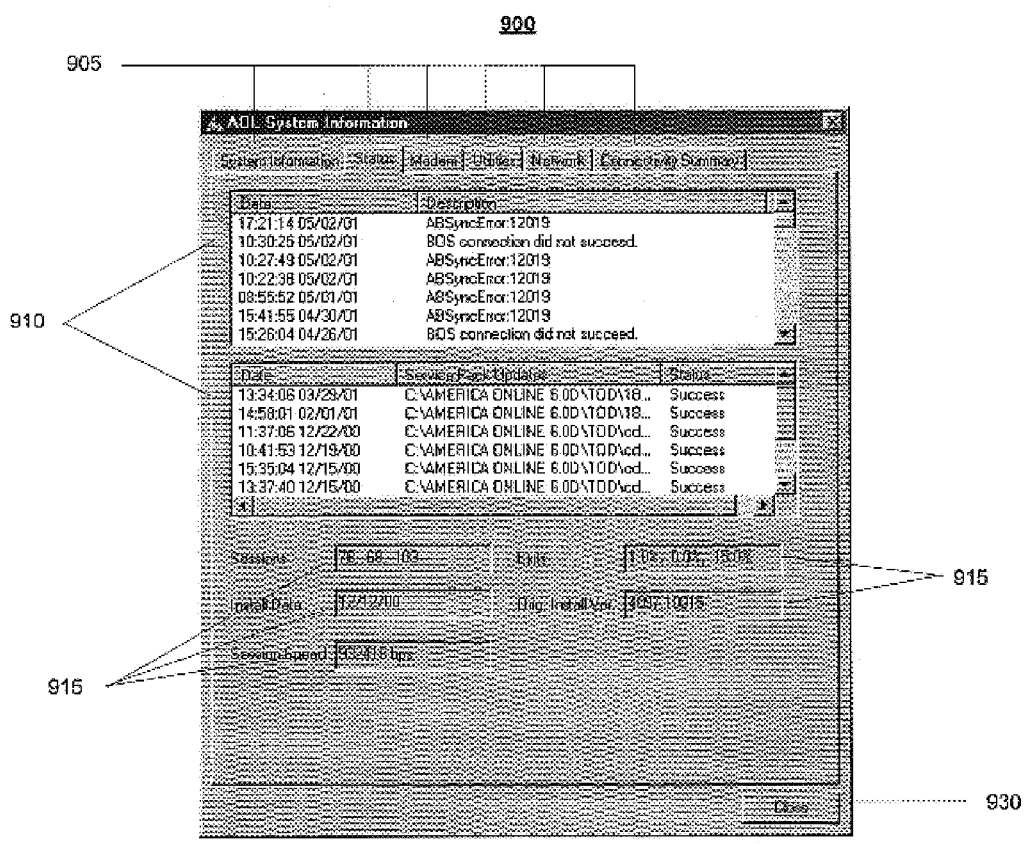

FIG. 9 is another example of a UI 900 that may be used to present the system characteristics of the client system 605. In this example, the content of the tab 905 labeled "Status" is visible, and the content of other tabs is hidden. The UI 900 includes list control boxes 910 containing information concerning system characteristics such as recently reported error messages and dates of software service pack updates. Edit boxes 915 contain information concerning system characteristics such as, number of sessions, client installation and version, client launches and exits, and session speed. The edit boxes 915 may also indicate abnormal session disconnects and/or abnormal shutdowns of the operating system. A close button 930 allows a user to close the UI 900.

Figure 10:
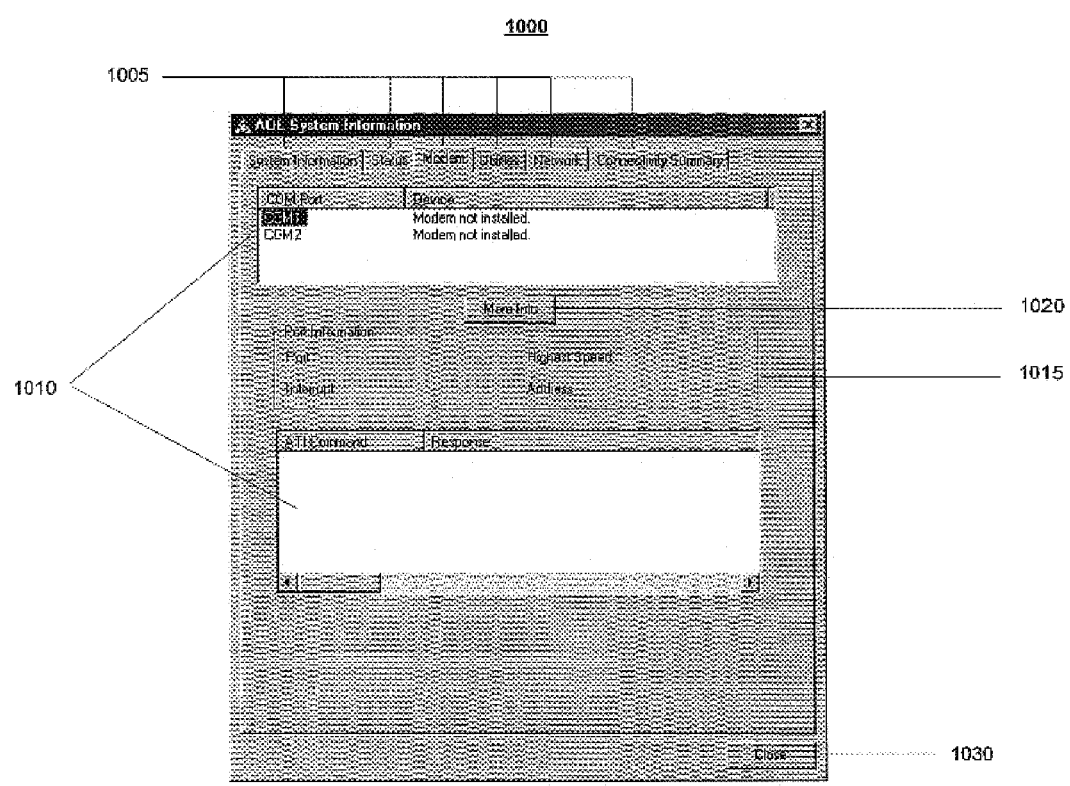

FIG. 10 is another example of a UI 1000 that may be used to present the system characteristics of the client system 605. In this example, the content of the tab 1005 labeled "Modem" is visible, and the content of other tabs is hidden. The UI1000 includes a list control box 1010 that contains information concerning system characteristics such as available modems or other communications devices installed, and the port or ports on which the devices are installed. The list control box 1010 also may contain a list of modem initialization strings and responses. Edit boxes 1015 contain information concerning system characteristics such as port information, interrupt, port address, and the highest speed supported by the port. A more info button 1020 displays more information about the port and modem devices when clicked. A close button 1030 allows a user to close the UI 1000.

Figure 11:
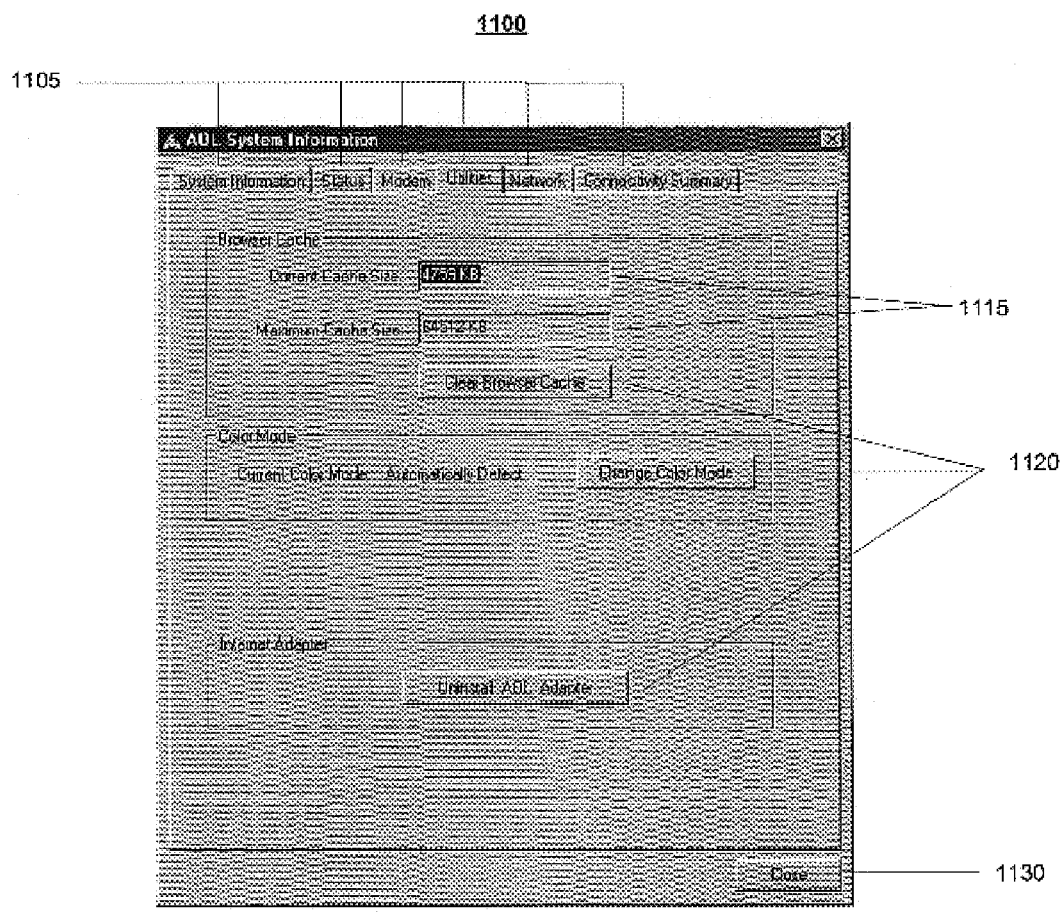

FIG. 11 is another example of a UI 1100 that may be used to present the system characteristics of the client system 605. In this example, the content of the tab 1105 labeled "Utilities" is visible, and the content of other tabs is hidden. Edit boxes 1115 contain information concerning system characteristics such as information about the browser cache, including current cache size and maximum cache size. Action buttons 1120 initiate remedial operations such as clearing the browser cache, changing the color mode, and uninstalling an Internet Adapter. A close button 1130 allows a user to close the UI 1100.

Figure 12:
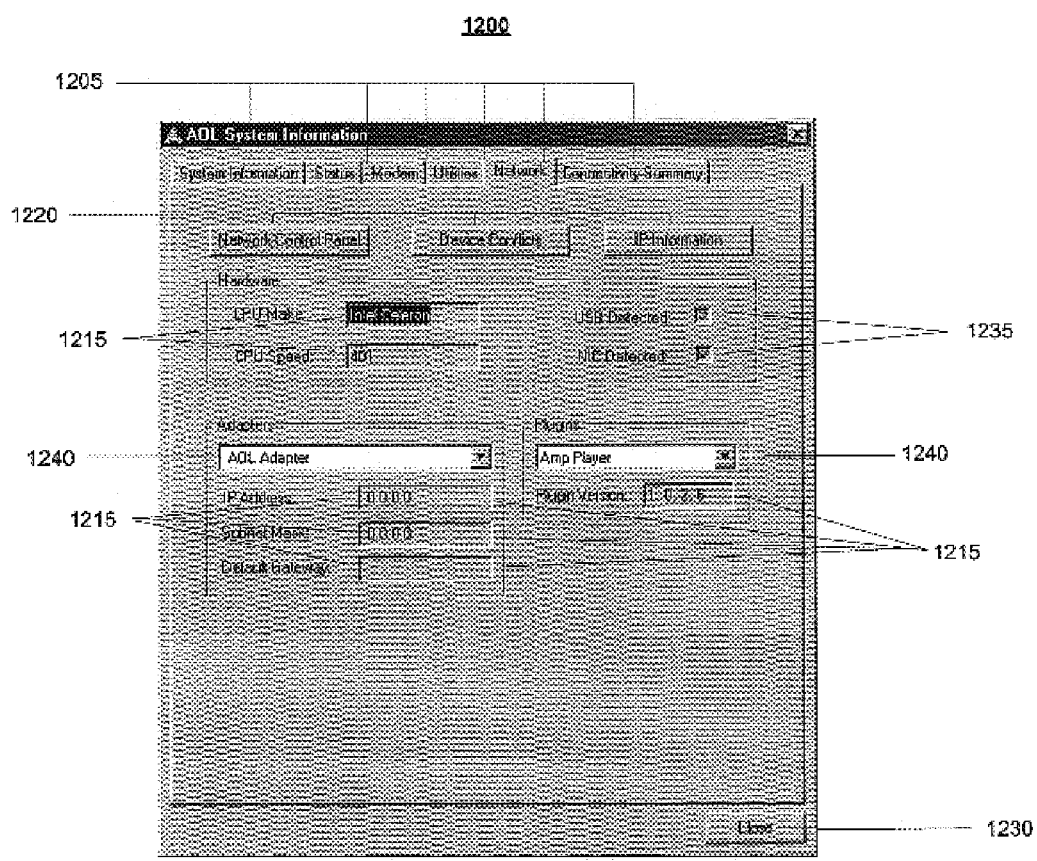

FIG. 12 is another example of a UI 1200 that may be used to present the system characteristics of the client system 605. In this example, the content of the tab 1205 labeled "Network" is visible, and the content of other tabs is hidden. Edit boxes 1215 contain information concerning system characteristics such as the CPU Make, CPU Speed, IP Address, Subnet Mask, Default Gateway, and Plugin Version. The UI 1200 also includes buttons 1220 that show the Network Control Panel, Device Conflicts, and IP Information. Check boxes 1235 indicate that a USB and NIC have been detected. Pull-down menus 1240 indicate that more information may be obtained on the system's Internet Adapter and WWW Plug-in. A close button 1230 allows a user to close the UI 1200.

Figure 13:
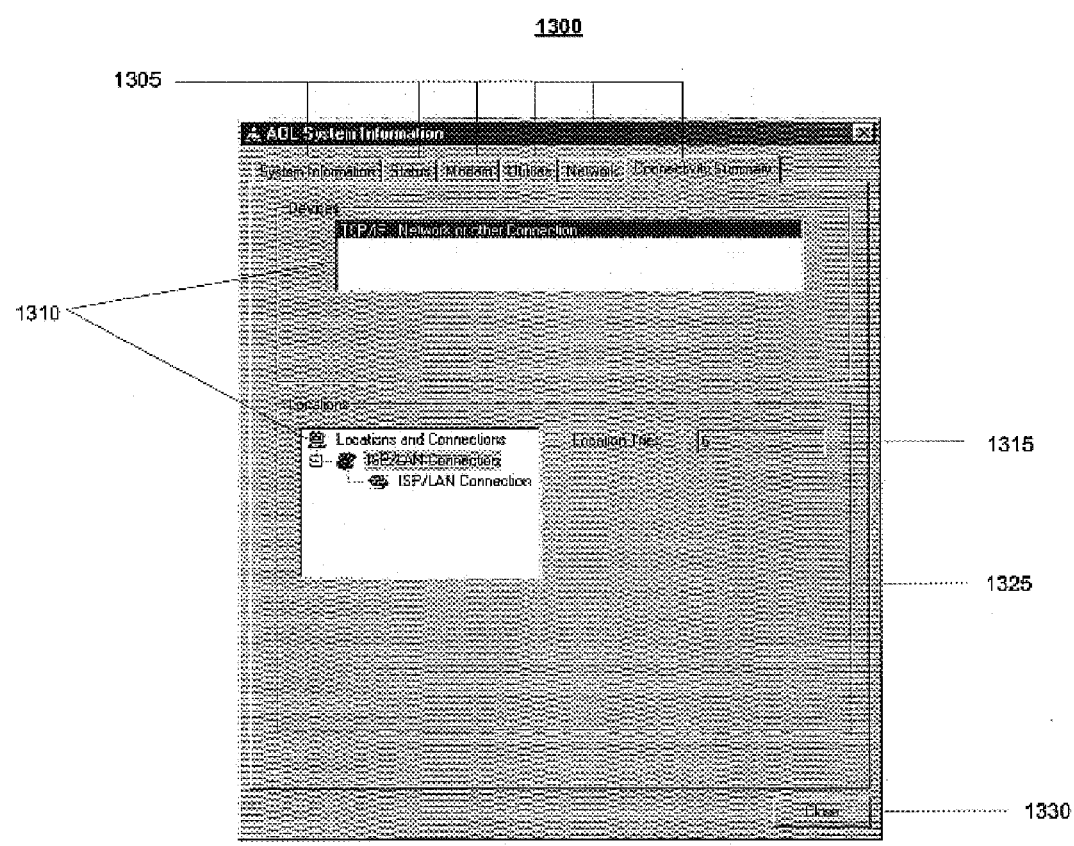

FIG. 13 is another example of a UI 1300 that may be used to present the system characteristics of the client system. In this example, the content of the tab 1305 labeled "Connectivity Summary" is visible, and the content of other tabs is hidden. The UI 1300 includes a list control box 1310 that contains information concerning system characteristics, such as devices and locations. Edit boxes 1315 contain information concerning system characteristics such as location tries. A close button 1330 allows a user to close the UI 1300.

Figure 14:
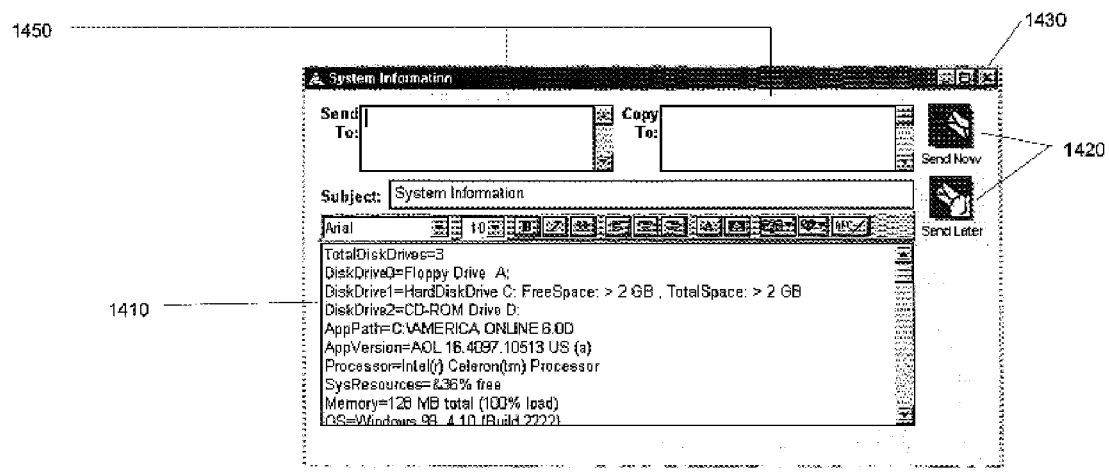

FIG. 14 is another example of a UI 1400 that may be used to present the system characteristics of the client system. In this example, the UI 1400 includes an e-mail message containing information about the system characteristics of a client. The e-mail message may contain system information 1410 including, but not limited to, the system characteristics described with respect to the "System Information" tab 805 of FIG. 8, the "Status" tab 905 of FIG. 9, the "Modem" tab 1005 of FIG. 10, the "Utilities" tab 1105 of FIG. 11, the "Network" tab 1205 of FIG. 12, and the "Connectivity Summary" tab 1305 of FIG. 13. In general, the system information 1410 includes information about total disk drives, information about individual disk drives, the path for an application, the version of an application, the client processor, the percentage of system resources free, total and available client memory, operating system, video information, browser information, multimedia information, and an application serial number.

The e-mail message may be sent to one or more designated addressees by entering address information into address fields 1450. Address information (e.g., e-mail address of a consultant) may be supplied automatically or manually by the subscriber. The subscriber may enter additional text and/or attached files to the e-mail message. The subscriber can send the e-mail message immediately or delay sending using buttons 1420. A button 1430 allows a subscriber to close the UI 1400.

Aspects of a number of implementations have been described above. Nevertheless, it will be understood that other implementations are within the scope of the following claims.

What is claimed is:

1. A method for enabling diagnostics on a networked computer system, the method comprising:

executing, at the networked computer system, a client application that enables connectivity by the networked computer system to a network of other computer systems;

executing, at the networked computer system, a performance monitoring application configured to monitor operational performance related to the connectivity enabled by the client application and to track client status information related to the monitored operational performance, the performance monitoring application being executed independently of the client application; and enabling access to the client status information when performing diagnostics on the client application or the networked computer system.

2. The method of claim 1 wherein the performance monitoring application comprises an application that executes independently of the client application.

3. The method of claim 1 wherein performing diagnostics comprises providing customer service.

4. The method of claim 1 wherein monitoring the operational performance comprises monitoring the operational performance by a persistently running performance monitoring application.

5. The method of claim 1 wherein enabling access comprises enabling electronic access by a host system.

6. The method of claim 5 wherein enabling electronic access by the host system comprises automatically providing the client status information to the host system in response to an action by a subscriber to enable electronic access.

7. The method of claim 1 wherein the client status information comprises information relating to one or more abnormal events.

8. The method of claim 1 wherein the client status information comprises one or more of a list of recent error messages relating to the client application, a list of installed updates relating to the client application, session information relating to the client application, a number of application launches of the client application, a number of logged on sessions of the client application, a number of tray launches of the client application, a number of exits from the client application, and a percentage of abnormally disconnected sessions from the client application.

9. The method of claim 1 wherein the client status information comprises information relating to an improper closing of the client application.

10. The method of claim 9 wherein the client status information comprises a count of the improper closings.

11. The method of claim 1 wherein the client status information comprises information relating to an unintentional closing of the client application.

12. The method of claim 11 wherein the client status information comprises a count of the unintentional closings.

13. The method of claim 1 wherein the performance monitoring application is configured to create an output file.

14. The method of claim 1 wherein the client status information comprises an indication of a behavior of the client application.

15. The method of claim 1 wherein the performance monitoring application is configured to monitor operational performance related to the connectivity enabled by the client application by monitoring how the client application has performed or operated.

16. A computer program, stored on a computer readable medium, the computer program comprising instructions for:
executing, at a networked computer system, a client application that enables connectivity by the networked computer system to a network of other computer systems;
executing, at the networked computer system, a performance monitoring application configured to monitor operational performance related to the connectivity enabled by the client application and to track client status information related to the monitored operational performance, the performance monitoring application being executed independently of the client application; and
enabling access to the client status information when performing diagnostics on the client application or the networked computer system.

17. The computer program of claim 16 wherein the performance monitoring application comprises an application that executes independently of the client application.

18. The computer program of claim 16 wherein performing diagnostics comprises providing customer service.

19. The computer program of claim 16 wherein monitoring the operational performance comprises monitoring the operational status by a persistently running diagnostic application.

20. The computer program of claim 16 wherein enabling access comprises enabling electronic access by a host system.

21. The computer program of claim 20 wherein enabling electronic access by the host system comprises automatically providing the client status information to the host system in response to an action by a subscriber to enable electronic access.

22. The computer program of claim 16 wherein the client status information comprises information relating to one or more abnormal events.

23. The computer program of claim 16 wherein the client status information comprises one or more of a list of recent error messages relating to the client application, a list of installed updates relating to the client application, session information relating to the client application, a number of application launches of the client application, a number of logged on sessions of the client application, a number of tray launches of the client application, a number of exits from the client application, and a percentage of abnormally disconnected sessions from the client application.

24. The computer program of claim 16 wherein the client status information comprises information relating to an improper closing of the client application.

25. The computer program of claim 24 wherein the client status information comprises a count of the improper closings.

26. The computer program of claim 16 wherein the client status information comprises information relating to an unintentional closing of the client application.

27. The computer program of claim 26 wherein the client status information comprises a count of the unintentional closings.

28. The computer program of claim 16 wherein the performance monitoring application is configured to create an output file.

29. The computer program of claim 16 wherein the client status information comprises an indication of a behavior of the client application.

30. The computer program of claim 16 wherein the performance monitoring application is configured to monitor operational performance related to the connectivity enabled by the client application by monitoring how the client application has performed or operated.

31. A computer program, stored on a computer readable medium, the computer program comprising:
means for executing, at a networked computer system, a client application that enables connectivity by the networked computer system to a network of other computer systems;
means for executing, at the networked computer system, a performance monitoring application configured to monitor operational performance related to the connectivity enabled by the client application and to track client status information related to the monitored operational performance, the performance monitoring application being executed independently of the client application; and
means for enabling access to the client status information when performing diagnostics on the client application or the networked computer system.

* * * * *